United States Patent
Mathy, Jr.

(10) Patent No.: US 8,864,485 B2
(45) Date of Patent: Oct. 21, 2014

(54) ADJUSTABLE PLATEN ASSEMBLY FOR USE IN A CLAMP STATION

(75) Inventor: John M. Mathy, Jr., Stewartstown, PA (US)

(73) Assignee: Graham Engineering Corporation, York, PA (US)

(*) Notice: Subject to any disclaimer, the term of this patent is extended or adjusted under 35 U.S.C. 154(b) by 992 days.

(21) Appl. No.: 12/959,547

(22) Filed: Dec. 3, 2010

(65) Prior Publication Data

US 2012/0141625 A1   Jun. 7, 2012

(51) Int. Cl.
| | |
|---|---|
| *B29C 33/22* | (2006.01) |
| *B29C 49/56* | (2006.01) |
| *B29C 49/36* | (2006.01) |
| *B29C 49/04* | (2006.01) |

(52) U.S. Cl.
CPC ............. *B29C 33/22* (2013.01); *B29C 49/56* (2013.01); *B29C 49/36* (2013.01); *B29C 49/04* (2013.01)
USPC ......... 425/190; 425/195; 425/451.9; 425/472

(58) Field of Classification Search
USPC ............... 425/190, 193, 195, 541, 451.9, 472
See application file for complete search history.

(56) References Cited

U.S. PATENT DOCUMENTS

| | | | |
|---|---|---|---|
| 2,363,107 A | 11/1944 | Young | |
| 3,068,518 A | 12/1962 | Miller et al. | |
| 3,642,410 A | 2/1972 | Bourgeois | |
| 3,764,250 A | 10/1973 | Waterloo | |
| 4,227,871 A | 10/1980 | Rainville et al. | |
| 4,613,475 A * | 9/1986 | Hettinga | ............. 425/451.9 |
| 4,615,857 A | 10/1986 | Baird | |
| 4,634,366 A | 1/1987 | Brun et al. | |
| 4,708,625 A | 11/1987 | Arend | |
| 5,066,217 A | 11/1991 | Fukuzawa et al. | |
| 5,110,283 A | 5/1992 | Bluml et al. | |
| 5,123,834 A | 6/1992 | Joyner | |
| 5,162,782 A | 11/1992 | Yoshioka | |
| 5,188,850 A | 2/1993 | Hirata et al. | |
| 5,192,557 A | 3/1993 | Hirata et al. | |
| 5,474,438 A * | 12/1995 | Walker, Jr. | ............. 425/190 |
| 5,593,711 A | 1/1997 | Glaesener | |

(Continued)

FOREIGN PATENT DOCUMENTS

| | | |
|---|---|---|
| EP | 0192814 A2 | 9/1985 |
| WO | 2010105023 A2 | 9/2010 |

OTHER PUBLICATIONS

PCT International Search Report & Written Opinion; Mar. 5, 2012; 12 pgs.

*Primary Examiner* — James Mackey
(74) *Attorney, Agent, or Firm* — McNees Wallace & Nurick LLC

(57) ABSTRACT

An adjustable platen assembly and method of assembly therefore. The platen assembly has a platen and a pressure plate attached to the platen. The pressure plate may be rotatable around a longitudinal axis of the rod according to the size of a mold half mounted to the platen. The platen assembly may have at least one platen support mounted to the platen. The at least one platen support may be rotatably mounted to the mold clamp. The at least one platen support can be rotated according to the size of a mold half mounted to the platen. The adjustable platen provides support to the mold half to reduce the amount of deformation to the mold half that is caused by the application of a closing force.

7 Claims, 4 Drawing Sheets

(56) References Cited

U.S. PATENT DOCUMENTS

| | | |
|---|---|---|
| 5,750,162 A | 5/1998 | Schad et al. |
| 5,776,402 A | 7/1998 | Glaesener |
| 6,179,607 B1 | 1/2001 | Inaba et al. |
| 6,439,876 B1 | 8/2002 | Glaesener |
| 7,080,978 B2 | 7/2006 | Glaesener |
| 7,150,617 B1 | 12/2006 | Lowell et al. |
| 2008/0175944 A1 | 7/2008 | Teng et al. |
| 2010/0230868 A1* | 9/2010 | Oles .............................. 425/532 |

* cited by examiner

ADJUSTABLE PLATEN ASSEMBLY FOR USE IN A CLAMP STATION

FIELD OF THE INVENTION

The invention relates generally to an extrusion molding apparatus. Specifically, the present invention relates to an adjustable platen assembly for use in mold clamping assemblies of a molding apparatus.

BACKGROUND OF THE INVENTION

Platens are essentially robustly constructed support structures that locate, support and align mold halves under applied clamp/closure tonnage. Each platen in a system must therefore be arranged to convey force effectively to the mold. In a molding process, as will be understood, it is important to maintain a high degree of parallelism between surfaces of a platen (and also between platens), since distortion in the platen correspondingly and usually induces distortion in a mold half (and particularly the mold face) located within the platen. Indeed, under applied clamp tonnage, platens should ideally be entirely resilient to physical distortions in their structure, thereby ensuring that a mold surface remains undistorted and hence substantially (and preferably entirely) flat. It is important to maintain, as far as possible, the flatness of the mold and platens.

In use, mold-bearing faces of co-operating platens are moved relative to each other to cause the formation of a mold through the aligned abutment of complementary mold halves. Under subsequently applied clamp tonnage, injection of melt can commence into a resultant mold cavity defined by the two mold halves. Once in abutting and locked engagement, a clamp force is conveyed through the platens. Molten plastics material may then be injected (by an injection unit) into a mold cavity defined by the mold halves, thereby to form an article having a predefined shape. To enhance productivity, the mold halves are cooled by a water cooling system comprising a number of water-carrying tubes, which system increases the rate at which the injected (e.g. molten plastics material) solidifies. The clamping force is then removed and the mold halves opened/separated to allow ejection or extraction of the molded article. The process can then be repeated.

Machines for injection molding of plastics articles may include a pair of fixed platens that are spaced from each other and that are interconnected by generally four parallel tie bars that have their axes positioned to define a rectangular array. One of the fixed platens remains stationary and is adapted to support one portion of a two- or multiple-piece injection mold that when assembled or engaged defines a mold cavity to correspond with the outline of a desired molded part. A movable platen is slidably carried on the tie bars between the fixed platens and is adapted to carry a cooperating portion of the mold so that when the movable platen is moved toward the mold-portion-carrying fixed platen, the two mold portions come into contact to define therebetween a mold cavity for forming the desired part.

The movable platen is generally a plate-like structure that is of rectangular configuration and includes four bores at the respective corners, through each of which a tie bar extends. A movable platen actuation system is positioned between the non-mold-carrying fixed platen and the movable platen to cause the movable platen to move along the tie bars toward or away from the mold platen, and also to hold the movable platen firmly in position when the mold portions are together, to prevent separation of the molds as molten material is injected into the mold cavity under high pressure.

Injection molding machine platens are typically block-shaped as shown in U.S. Pat. No. 5,188,850 to Hirata et al.; U.S. Pat. No. 5,066,217 to Fukuzawa et al.; U.S. Pat. No. 5,110,283 to Bluml et al.; U.S. Pat. No. 5,123,834 to Joyner; U.S. Pat. No. 5,162,782 to Yoshioka; U.S. Pat. No. 5,192,557 to Hirata et al; U.S. Pat. No. 5,593,711 to Glaesener; and U.S. Pat. No. 5,776,402 to Glaesener. In each of these patents, the mold platen is substantially block-shaped, having a substantially rectangular side which supports a mold half. During clamp-up of mold halves, a force is generated against the mold-mounting face of the platen. As is typical with such block-shaped platens, the mold-mounting face is caused to concavely deform, forcing the top and bottom edges of the side towards the oncoming force and causing the platen to bend and provide tension across the back side of the mold platen. As a result, under the clamp-up force, the center of the platens separate causing a gap between the mold halves, and in some cases, the formation of flash is a by-product.

U.S. Pat. No. 4,615,857 to Baird discloses an encapsulation means and method for reducing flash during mold operations. In accordance with this device, it is alleged that injection and transfer molding of plastic is performed in a manner that virtually eliminates flash. Deflection of the mold press therein is measured with the mold press in the clamping configuration. The support structure of the mold is arranged to apply an equal force to the mold face by configuring supporting pillars and bars such that they act as individual springs against the mold face and in response to the force generated while the mold is in the clamping configuration. The spring constants and the lengths of the supporting pillars and bars are calculated to account for the actual deflection found in the mold press, thereby producing a uniform pressure on the molds during clamping of the press.

U.S. Pat. No. 6,439,876 to Glaesener discloses an injection molding which includes a stationary platen having a first mold half and at least one movable platen having a second mold half for forming a mold with said first mold half. For one of the platens, a back face is positioned central to the platen for the connection to a pressure source such as a hydraulic cylinder. Parallel to and spaced from the back face is a front face for carrying a mold half, and protruding rearward from the periphery of the front face is a structural wall. Extending from the back face to the front face are a plurality of spaced ribs which are rigidly affixed to the structural wall in a structurally-optimized pattern. Means for uniformly directing the clamping force from the center of the back face to the front face to reduce localized bending of the mold face is provided.

While the platens described in the prior art help to properly distribute forces to the mold, each platen is designed to optimize the distribution of forces with respect to a particular mold size. If platens of incorrect size are used, the mold halves are subject to bending, as described above, which results in unwanted flash on the molded product. Consequently, if a larger or smaller mold is used, the platens must be removed and replaced with a different size platen to ensure that the forces will be distributed properly over the entire mold half. This requires that the molding machine be taken offline while the platen is removed and replaced with a platen of appropriate size.

Accordingly, there exists a need for an adjustable platen which can be used with molds of different sizes and which includes means for eliminating or reducing platen deflection during mold or press clamp-up and which substantially eliminates the creation of flash during injection molding.

SUMMARY OF THE INVENTION

An object of the invention is to provide improved force support of a platen assembly resulting in negligible deformation of the mold halves even around the perimeter thereof.

Another object of the invention is to provide a platen assembly which results in an ability to reduce closure/clamp tonnage while still retaining good performance.

Another object of the invention is to provide a platen assembly which results in a reduction in the energy required during the molding process.

Another object of the invention is to provide an optimized platen assembly for the uniform transmission of a clamp force to mold half surfaces. As a result, a uniform pressure distribution exists at the mold half surface, and localized bending and deflections are minimized.

Another object of the invention is to provide a platen assembly which permits the reduction of clamp force while still avoiding flash on the molded article.

One aspect of the invention is directed to a platen assembly for use with a mold clamp, the mold clamp having a rod which interacts with the platen assembly. The platen assembly has a platen and a pressure plate attached to the platen. The pressure plate is rotatable around a longitudinal axis of the rod. The pressure plate can be rotated according to the size of a mold half mounted to the platen, so that forces applied by the rod to the pressure plate are distributed to the platen and to a mold half over a large surface area to reduce the amount of deformation caused to the mold half by the application of the force.

Another aspect of the invention is directed to a platen assembly for use with a mold clamp, the mold clamp having a rod which interacts with the platen assembly. The platen assembly has a platen, and at least one platen support mounted to the platen. The at least one platen support is rotatably mounted to the mold clamp. The at least one platen support can be rotated according to the size of a mold half mounted to the platen, so that the positioning of the at least one platen support and the cooperation of the at least one platen support with the rod provide a support structure proximate the perimeter of the platen and mold half to prevent the bowing or distortion of the mold half.

Another aspect of the invention is directed to a method of assembling a platen assembly for use with a mold clamp, the mold clamp having a rod which interacts with the platen assembly. The method includes the steps of: determining the size of mold half to be used; adjusting components of the platen assembly to conform to the size of the mold half; attaching a platen to the components; and applying a force. The adjusted platen assembly cooperates with the mold half to reduce the amount of deformation to the mold half that is caused by the application of the force.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
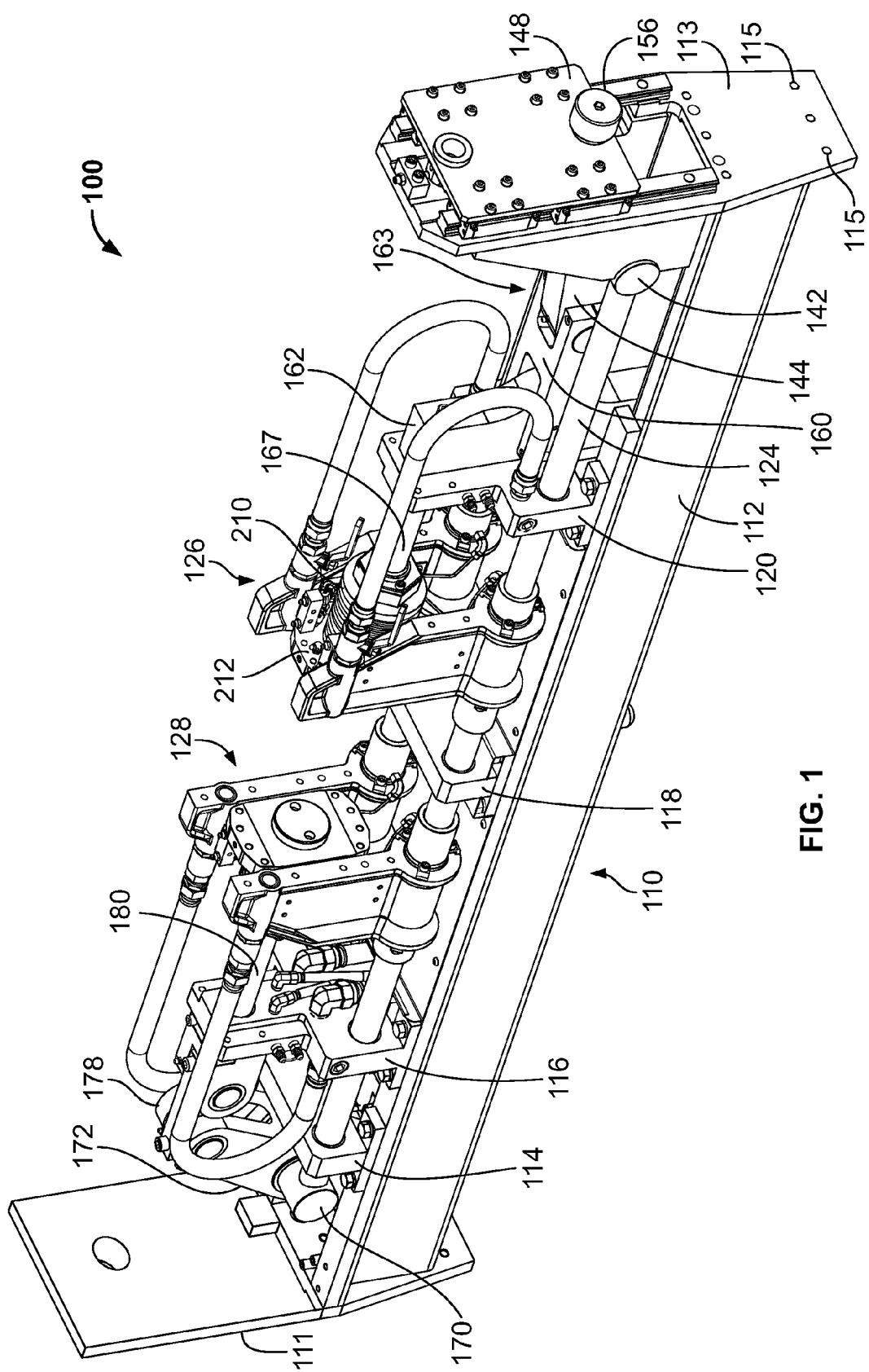
FIG. 1 is a perspective view of an exemplary embodiment of a modular mold clamp assembly with an adjustable platen assembly.
Figure 2:
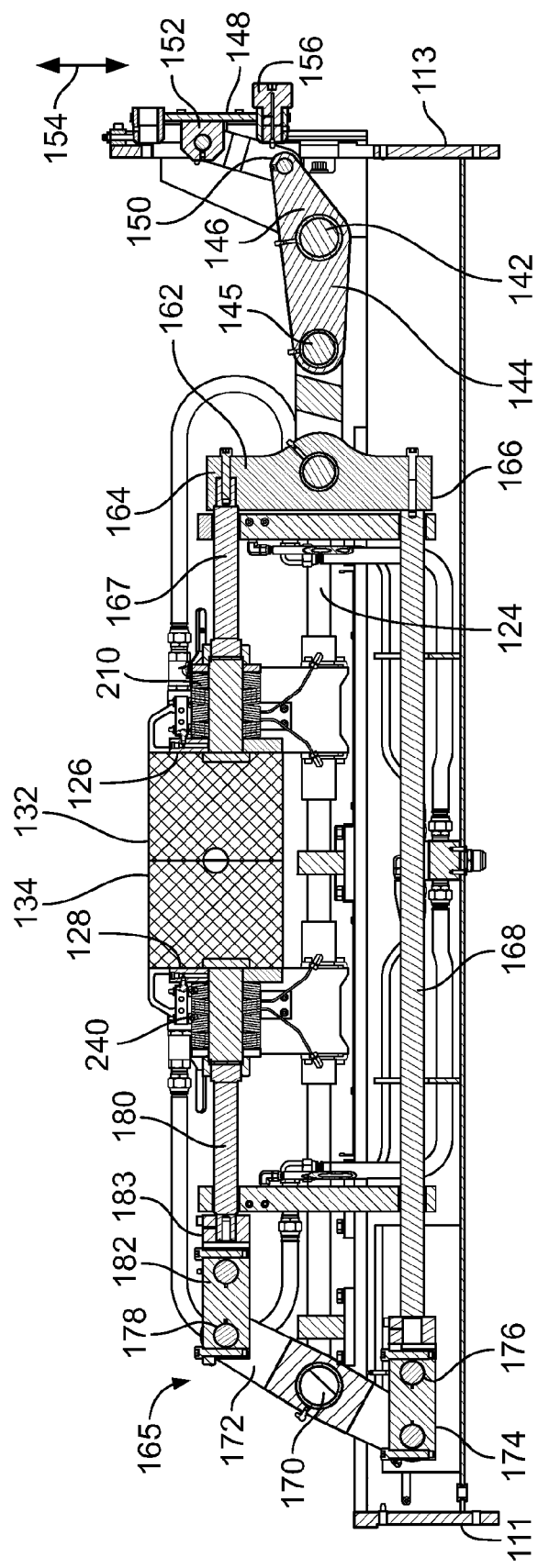
FIG. 2 is a cross-sectional view of the modular mold clamp assembly of FIG. 1 taken along the longitudinal axis of the modular mold clamp assembly.
Figure 3:
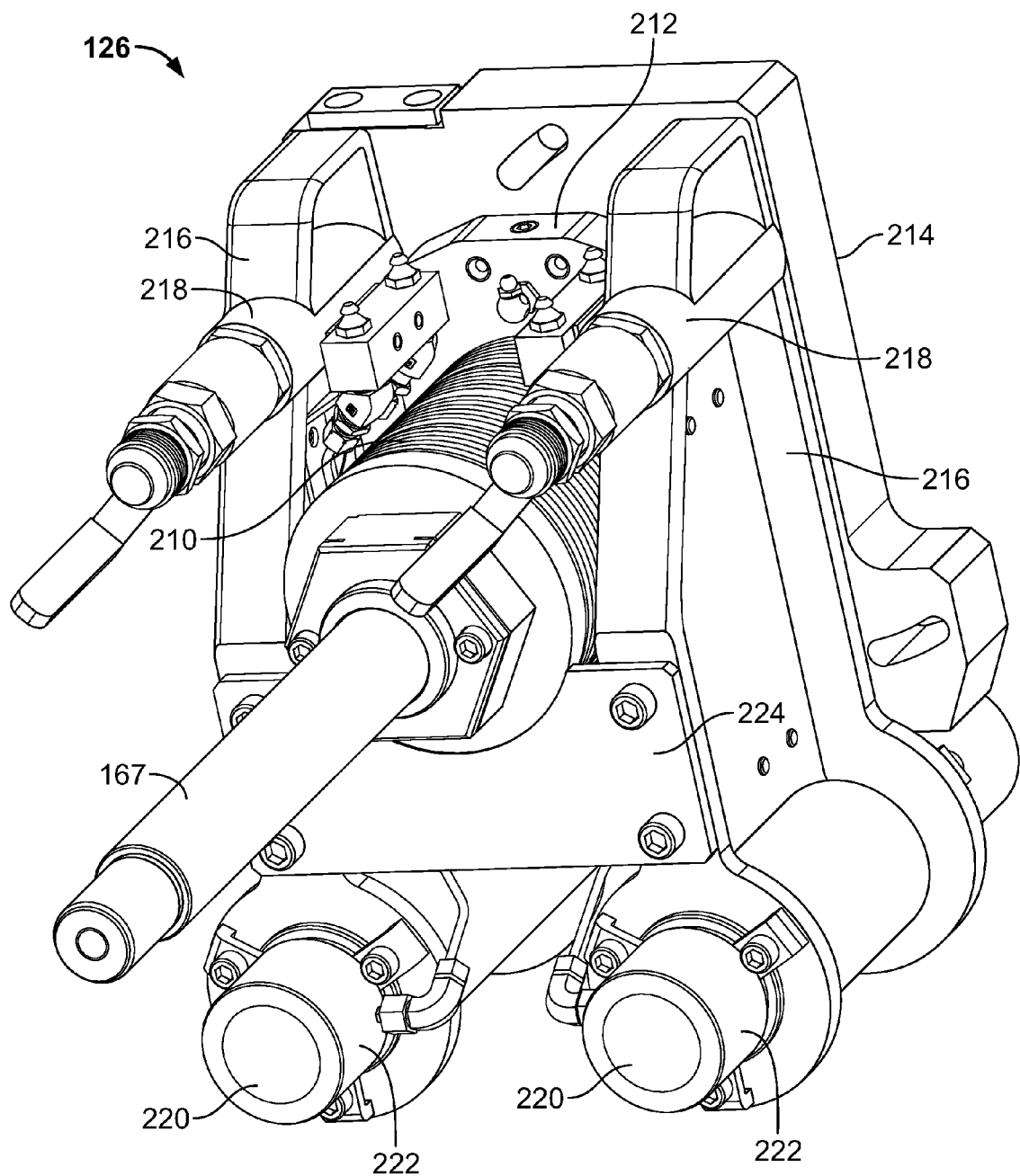
FIG. 3 is an enlarged perspective view of the adjustable platen assembly, the adjustable platen assembly shown assembled for use with a relatively small mold half.

Referring to FIGS. 1-3, platen assemblies 126, 128 for use in a molding operation are shown. While the platen assembly can be used in any type of molding apparatus, the exemplary molding clamp assembly 100 shown is configured to be used in a rotary of a blow molding machine. As the base operation of the rotary blow molding machine is known, a detailed description will not be provided. However, further details can be found in U.S. Pat. No. 3,764,250, which is hereby incorporated, in its entirety, by reference.

Referring to FIG. 1, an exemplary embodiment of the mold clamp assembly 100 is shown. The modular mold clamp assembly 100 has a frame 110. The frame 110 has a base member 112 and two oppositely-facing end members 111, 113. The end members 111, 113 extend from either end of the base member 112 in a direction that is essentially transverse to the longitudinal axis of the base member 112. The end members 111, 113 are integrally attached to the base member in any known manner which has the strength characteristics required. Mounting openings 115 are provided on the frame 110 proximate the ends of the base member 112. The base member 112 and end members 111, 113 are made from any material that has the strength characteristics required to support the components of the modular mold clamp assembly 100 and to provide the structural integrity required.

Each modular mold clamp assembly 100 includes rods 124 mounted on base member 112 of frame 110. The rods 124 extend essentially parallel to the longitudinal axis of the base member 112. As best shown in FIG. 1, rods 124 extend through openings in mounting brackets 114, 116, 118, 120. In the embodiment shown, the mounting brackets 114, 116, 118, 120 are fixed to the base member 112 by bolts or other mounting hardware.

Pin 142 extends through a portion of end member 113. The adjacent ends of rods 124 are secured to the pin. Pivot arm 144 is rotatably mounted on pin 142 between the rods 124. The outer end 146 of arm 144 away from the mold halves extends through an opening in end member 113 and is connected to follower slide 148 by links 150. The follower slide 148 is mounted on the outside surface of the end wall 113 by slide 152 to permit movement of the follower slide back and forth in the direction of arrow 154 shown in FIG. 1. Follower slide 148 carries cam follower roller 156, which extends into circumferential fixed cam slot (not shown) of the blow molding machine. Movement of the mold clamp assembly 100 moves follower 156 into and around the cam slot to slide follower slide 148 inwardly and outwardly and rotate arm 144 between the open and closed positions.

Shift member 162 is located between mold platen assembly 126 and end member 113. A push bar or cylindrical rod 167 extends from an upper end 164 of member 162 and is fixed to mold platen assembly 126 so that movement of member 162 toward end member 113 moves the mold platen assembly 126 and mold half 132 toward the end member 113.

Referring to FIGS. 1-3, rod 167 is connected to platen assembly 126 through a dished spring pack 210. A first end of the spring pack 210 is secured to the rod 167 in any known manner which maintains the position of the first end of the spring pack 210 relative to the rod 167 as the rod 167 is moved. The second end of the spring pack 210 is attached to a pressure plate 212. A platen 214 is mounted to the pressure plate 212 using known mounting methods. In the embodiment shown, the platen 214 is a plate which is made from any material having the strength characteristics required. The platen 214 is sized according to the size of the mold half 132 which will be used.

The platen assembly 126 also has platen supports 216 which are mounted to the platen 214. In the embodiment shown, the platen supports 216 are a pair of movable arms, with one platen support 216 symmetrically positioned on either side of rod 167. The platen supports 216 have openings 218 positioned proximate a top end thereof. Water hoses are connected to the openings 218 to facilitate the movement of water through the platen assembly and into the mold half 132 associated with the platen assembly 126. Each platen support is mounted on a respective rod 124 through mounting opening 220 which permits movement of the platen support 216 of the platen assembly 126 between a first and second position during the closing and opening of mold half 132. Mounting bearings 222 are positioned adjacent the mounting openings 220. The mounting bearings 222 facilitate the movement of the platen assembly 126 as the mold half 132 is opened and closed. Other known features such as grease lines and the like may be provided on the platen assembly.

A support bracket 224 is provided on the platen assembly 126 opposite the platen 214. The support bracket 224 is mounted to the platen supports 216 to provide increased stability to the platen assembly 126, as will be more fully described. The size of the support bracket 224 and the size of the platen 214 will vary depending upon the size of the mold used in the mold clamp assembly 100.

The lower end 166 of shift member 162 extends into base member 112 and extends below mold halves 132 and 134. The shift member is slidably mounted on rods 124.

Link 160 is pivotally connected to the inner link end 145 of arm 144 and to mold shift member 162. The pivot connection between link 160 and member 162 is located halfway between the upper end 164 and lower end 166 of member 162 to balance forces. Shift rod 168 is parallel to the longitudinal axis of the base member 112 and extends freely through the base member 112. The shift rod 168 is connected to the lower end 166 of member 162. The link 160 and inner link end 145 of arm 144 form a two-link extendable and retractable drive 163 for opening and closing platen assembly 126 and platen assembly 128 and mold halves 132, 134.

Cross pin 170 is slidably mounted on the ends of rods 124 extending past platen assembly 128 and mold half 134 and rotatably supports pivot arm 172. The lower end 174 of arm 172 is connected to the adjacent end of shift rod 168 by pivot link 176. The upper end 178 of arm 172 is connected to push bar or mold clamp rod 180 by pivot link 182.

Figure 4:
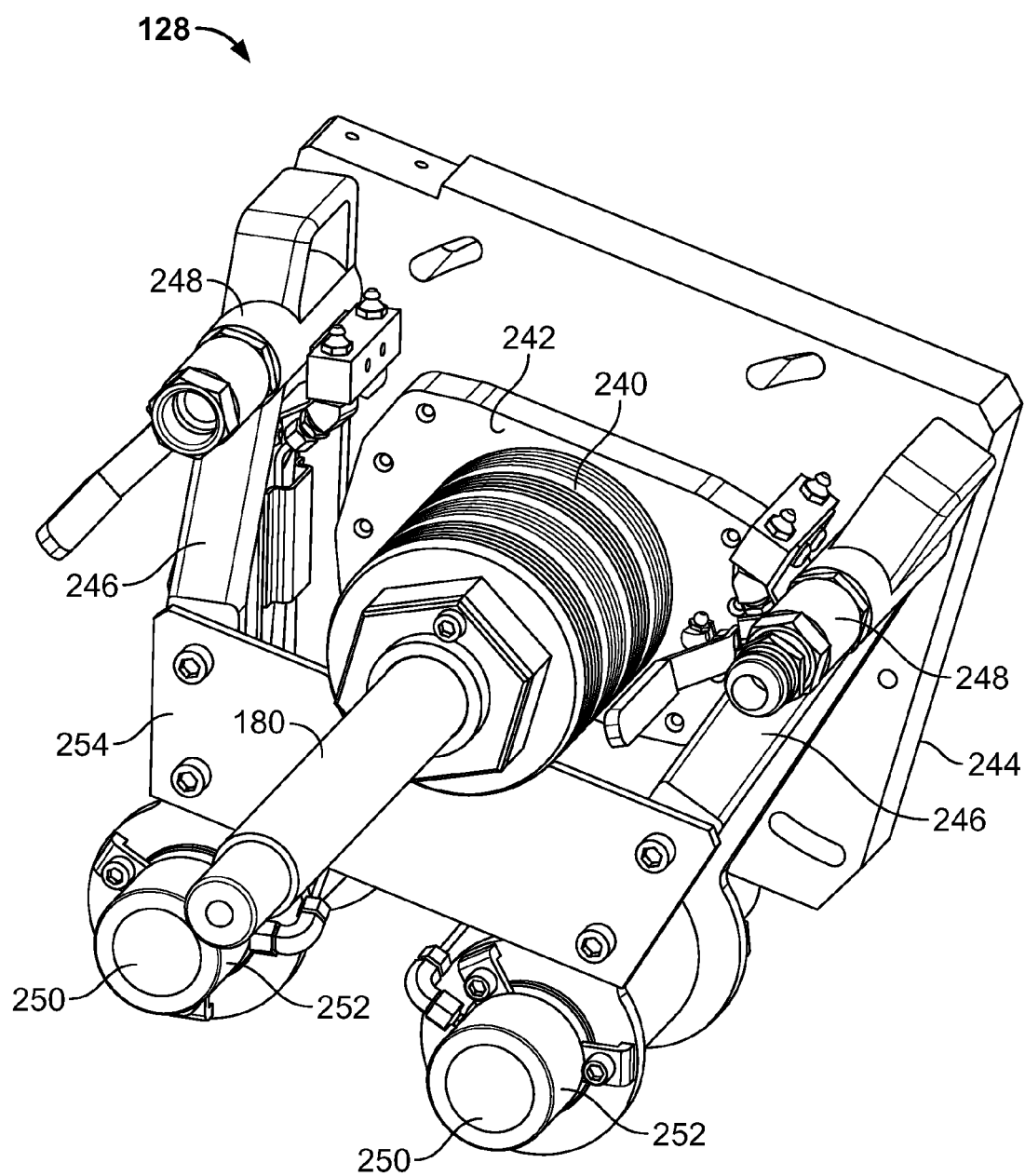
FIG. 4 is an enlarged perspective view of the adjustable platen assembly, the adjustable platen assembly having a pressure plate rotated ninety degrees and platen supports rotated outward from that shown in FIG. 3, the adjustable platen assembly shown assembled for use with a relatively large mold half.

Referring to FIGS. 1, 2 and 4, rod 180 is connected to platen assembly 128 through a dished spring pack 240. A first end of the spring pack 240 is secured to the rod 180 in any known manner which maintains the position of the first end of the spring pack 240 relative to the rod 180 as the rod 180 is moved. The second end of the spring pack 240 is attached to a pressure plate 242. A platen 244 is mounted to the pressure plate 242 using known mounting methods. In the embodiment shown, the platen 244 is a plate which is made from any material having the strength characteristics required. The platen 244 is sized according to the size of the mold half 134 which will be used.

The platen assembly 128 also has platen supports 246 which are mounted to the platen 244. In the embodiment shown, the platen supports 246 are a pair of movable arms, with one platen support 246 symmetrically positioned on either side of rod 180. The platen supports 246 have openings 248 positioned proximate a top end thereof. Water hoses are connected to the openings 248 to facilitate the movement of water through the platen assembly and into the mold half 134 associated with the platen assembly 128. Each platen support is mounted on a respective rod 124 through mounting opening 250 which permits movement of the platen support 246 of the platen assembly 128 between a first and second position during the closing and opening of mold half 134. Mounting bearings 252 are positioned adjacent the mounting openings 250. The mounting bearings 252 facilitate the movement of the platen assembly 128 as the mold half 134 is opened and closed. Other known features such as grease lines and the like may be provided on the platen assembly.

A support bracket 254 is provided on the platen assembly 128 opposite the platen 244. The support bracket 254 is mounted to the platen supports 246 to provide increased stability to the platen assembly 128, as will be more fully described. The size of the support bracket 254 and the size of the platen 244 will vary depending upon the size of the mold used in the mold clamp assembly 100.

Rod 168, arm 172 and 180 are part of a mold shift mechanism for opening and closing platen assembly 128 and mold half 134. The mold shift mechanism is connected to drive 163 through member 162.

Prior to beginning the molding operation, the operator determines the size of the mold halves 132, 134 to be used. Once determined, the operator may adjust the platen assemblies 126, 128 accordingly.

If the mold halves 132, 134 are relatively small, the operator configures each platen assembly as shown in FIG. 3. As shown, the pressure plate 212, 242 is rotated such that the longitudinal axis of the pressure plate 212, 242 is essentially perpendicular to the plane of the longitudinal axis of the mold clamp assembly 100. The platen supports 216, 246 are rotated such that the longitudinal axis of each platen support 216, 246 is essentially parallel to the longitudinal axis of the pressure plate 212, 242. The size of each platen 214, 244 is chosen to provide a similar shape and surface area as the end wall of the respective mold half 132, 134. The properly sized platen 214, 244 is mounted on the platen supports 216, 246 and the pressure plate 212, 242. A properly sized support bracket 224, 254 is chosen and mounted on the platen supports 216, 246. The order in which these operations are performed may vary according to the preferences of the operator or other factors.

If the mold halves 132, 134 are relatively large, the operator configures each platen assembly as shown in FIG. 4. As shown, the pressure plate 212, 242 is rotated such that the longitudinal axis of the pressure plate 212, 242 is essentially parallel to the plane of the longitudinal axis of the mold clamp assembly 100. The platen supports 216, 246 are rotated such that the longitudinal axis of each platen support 216, 246 is angled relative to the longitudinal axis of the pressure plate 212, 242. The size of each platen 214, 244 is chosen to provide a similar shape and surface area as the end wall of the respective mold half 132, 134. The properly sized platen 214, 244 is mounted on the platen supports 216, 246 and the pressure plate 212, 242. A properly sized support bracket 224, 254 is chosen and mounted on the platen supports 216, 246. The order in which these operations are performed may vary according to the preferences of the operator or other factors.

With the platen assembly properly configured, the mold halves 132, 134 are placed in position in the mold clamp assembly 100. The platen assemblies 126, 128 and the mold halves are driven, by operation of the mold clamp assembly 100, from the open position to the closed position. As this occurs, the rod 167 pushes the spring pack 210 which pressure plate 212 and platen 214. The platen 214 cooperates with the mold half 132 to move the mold half toward the closed position. As the platen 214 is moved, the platen supports 216, which are attached to the platen 214, are also moved along the rod 124. Simultaneously, the rod 180 pushes the spring pack 240, pressure plate 242 and platen 244. The platen 244 cooperates with the mold half 134 to move the mold half toward the closed position. As the platen 244 is moved, the platen supports 246, which are attached to the platen 244 are also moved along the rod 124.

As the mold halves 132, 134 approach the closed position, the mold halves 132, 134 engage each other. Consequently, as the rods 167, 180 are further advanced, the spring packs 210, 240 are compressed against the pressure plates 212, 242. This causes the forces exerted against each of the mold halves 132, 134 to be substantially equal and in opposite directions.

By utilizing the spring packs 210, 240 to apply the final closing pressure upon the platens 214, 244 and the mold halves 132, 134 carried thereby, a predetermined limit in pressure can be imposed upon the mold halves 132, 134. This pressure is adjusted to suit the size of the product being molded in the cavities of the mold halves 132, 134. Such pressure can be adjusted, such as by manipulating the hardware which holds the spring packs 210, 240 to the rods 167, 180, or by other known methods.

With the mold halves 132, 134 in the closed position, it is important for the platen assemblies 126, 128 to exert a consistent and uniform force to maintain all parts of the mold halves 132, 134 in the proper closed position. In the prior art, due to uneven pressures that would be substantially lower at the outside edges of the mold as compared to the point where the rod pressure is applied, clamp tonnage was oversized to ensure adequate pressure along the outside edges of the mold.

In accordance with the present invention, pressures are substantially uniform across the face of the mold. The configuration of the pressure plates 212, 214 and the positioning of the platen supports 216, 246 provide forces which are distributed about the entire surface of the mold halves 132, 134, including the outside edges. In operation, forces are applied to the mold halves 132, 134 through the pressure plate 212, 242. As the force is applied, the platens 214, 244 and the mold halves 132, 134 have a proclivity to bow, causing the outer perimeter of the mold halves 132, 134 to slightly diverge or separate, which in turn can cause flash in the mold cavity. However, the configuration of the pressure plates 212, 242 and platen supports 216, 246 prevents or minimizes the bowing or distortion of the platens 214, 244 and the mold halves 132, 134.

In operation, the closing force is supplied to the mold halves 132, 134 through the rods 167, 180. The closing force is applied to the platens 214, 244 and the mold halves 132, 134 over a large surface area, as the pressure plates 212, 242 are dimensioned to cooperate with a large area of the platens 214, 244 and, consequently, the mold halves 132, 134. In so doing, the tendency of the mold halves 132, 134 to bow or deform is reduced, as the force is not applied at a single point, but rather over a large surface. As the closing force is applied, any tendency for the mold halves 132, 134 to bow results in the perimeter of the mold halves 132, 134 exerting a bowing force, which is opposed to the direction of the closing force, on the platens 214, 244 and the platen supports 216, 246. As the platen supports 216, 246 are properly positioned proximate the perimeter of the mold halves 132, 134, any bowing forces will be opposed by the resistance forces generated by the platen supports 216, 246. As the platen supports 216, 246 are mounted to the rods 124, the platen supports 216, 246 are prevented from pivoting thereabout. Therefore, any forces applied to the top of the platen supports 216, 246, which would cause the platen supports 216, 246 to pivot, are counteracted by the resistance forces generated by the rigidity and structure of the platen supports 216, 246 and rods 124. Therefore, unlike the prior art platens, the positioning of the platen supports 216, 246 and the cooperation of the platen supports 216, 246 with the rods 124 provide a support structure proximate the perimeter of the platens 214, 244 and mold halves 132, 134 to prevent the bowing or distortion of the mold halves 132, 134. The configuration and size of platen supports 216, 246 are based on structural analysis that yields an optimized design.

Support bracket 224, 254 also contributes to the stability of the platen supports 216, 246 and enhances the ability of the platen supports 216, 246 to resist the bowing forces. As the support brackets 224, 254 are attached to both platen supports 216, 246, the support brackets 224, 254 act as stiffeners which increase the structural rigidity of platen assembly 126, 128 and increase the load transmission capabilities of the platen supports 216, 246. The structure of the support brackets 224, 254 and platen supports 216, 246 prevents rotation of the structure relative to the platens 214, 244 and mold halves 132, 134, thereby increasing the ability of the platen supports 216, 246 to resist the bowing force applied thereto. Thus, the platen supports 216, 246 and support brackets 224, 254 interact in an advantageous manner to assist in resisting deformation of the mold halves 132, 134. Location and size of support brackets 224, 254 are based on structural analysis that yields an optimized design.

In practical terms, the improved force support of the platen assembly results in negligible deformation of the mold halves 132, 134, even around the perimeter thereof, which results in an ability to reduce closure/clamp tonnage while still retaining good performance. Consequently, smaller and more efficient machine components may be used and a reduction in the energy required during the molding process is achieved.

The present invention provides an optimized platen assembly for the uniform transmission of a clamp force to mold half surfaces. As a result, a uniform pressure distribution exists at the mold half surface, and localized bending and deflections are minimized. An advantage to this arrangement is the reduction of clamp force while still avoiding flash on the molded article.

Yet another advantage of the present invention is the reduction in energy usage of the molding machine to hold a mold closed during a molding operation, due to a uniformly distributed sealing pressure.

While a detailed description of the mold clamp assembly 100 has been provided, the platen assembly is not limited to use therein. The particular molding machine and mold clamp assembly are merely provided as an example of the type of system in which the platen assembly can be used. The platen assembly can be used with differing mold machines and different mold clamp assemblies without departing from the scope of the invention. The platen assembly can be used as a movable platen assembly, as described herein, or as a stationary platen assembly. Although the platen assemblies described herein are used as a pair, the teaching may be used with one platen assembly or any number of platen assemblies.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A platen assembly for use with a mold clamp, the mold clamp having a rod which interacts with the platen assembly, the platen assembly comprising:
   a platen;
   a pressure plate attached to the platen, the pressure plate being rotatable around a longitudinal axis of the rod;
   whereby the pressure plate can be rotated according to the size of a mold half mounted to the platen, so that forces applied by the rod to the pressure plate are distributed to the platen and to a mold half over a surface area to reduce the amount of deformation to the mold half caused by the application of the force.

2. The platen assembly as recited in claim 1, wherein at least one platen support is mounted to the platen, the at least one platen support being rotatably mounted to the mold clamp, whereby the at least one platen support can be rotated according to the rotation of the pressure plate and the size of a mold half mounted to the platen, so that the positioning of the at least one platen support and the cooperation of the at least one platen support with the rod provide a support structure proximate the perimeter of the platen and mold half to prevent the bowing or distortion of the mold half.

3. The platen assembly as recited in claim 2, wherein the at least one platen support is a pair of platen supports, with one platen support positioned on either side of the pressure plate.

4. The platen assembly as recited in claim 3, wherein a support bracket is provided opposite the platen, the support bracket being mounted to the platen supports, whereby the support bracket acts as a stiffener to increase the stability of the platen supports, enhance the ability of the platen supports to resist the bowing forces and increase the load transmission capabilities of the platen supports.

5. The platen assembly as recited in claim 3, wherein the platen supports are rotatably mounted on respective mounting rods of the mold clamp through mounting openings of the platen supports.

6. The platen assembly as recited in claim 5, wherein bearings are positioned adjacent the mounting openings to facilitate movement of the platen assembly between an open and a closed position.

7. The platen assembly as recited in claim 1, wherein a spring pack is attached to the pressure plate, the spring pack rotatable around the longitudinal axis of the rod, whereby a predetermined limit in closing pressure that is applied by the pressure plate can be imposed.

* * * * *